United States Patent
Brown et al.

(10) Patent No.: US 9,274,339 B1
(45) Date of Patent: *Mar. 1, 2016

(54) WORN DISPLAY SYSTEM AND METHOD WITHOUT REQUIRING REAL TIME TRACKING FOR BORESIGHT PRECISION

(71) Applicant: Rockwell Collins, Inc., Cedar Rapids, IA (US)

(72) Inventors: Robert D. Brown, Lake Oswego, OR (US); Steven J. Robbins, West Linn, OR (US); Francois Raynal, San Jose, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/109,551

(22) Filed: Dec. 17, 2013

Related U.S. Application Data (63) Continuation of application No. 12/700,557, filed on Feb. 4, 2010, now Pat. No. 8,659,826.

(51) Int. Cl.
*G02B 23/08* (2006.01)
*G02B 27/01* (2006.01)
*G02B 27/42* (2006.01)

(52) U.S. Cl.
CPC ........ *G02B 27/0172* (2013.01); *G02B 27/4205* (2013.01)

(58) Field of Classification Search
CPC .................. G02B 27/0172; G02B 27/42053
USPC .......... 359/402, 403, 566, 567, 630, 634, 636
See application file for complete search history.

(56) References Cited

U.S. PATENT DOCUMENTS

| | | | |
|---|---|---|---|
| 2,141,884 | A | 12/1938 | Sonnefeld |
| 3,851,303 | A | 11/1974 | Muller |
| 3,885,095 | A | 5/1975 | Wolfson et al. |
| 3,940,204 | A | 2/1976 | Withrington |
| 4,082,432 | A | 4/1978 | Kirschner |
| 4,099,841 | A | 7/1978 | Ellis |
| 4,178,074 | A | 12/1979 | Heller |

(Continued)

FOREIGN PATENT DOCUMENTS

| | | |
|---|---|---|
| CN | 101881936 A | 11/2010 |
| DE | 10 2006 03 785 | 7/2007 |

(Continued)

OTHER PUBLICATIONS

Final Office Action on U.S. Appl. No. 13/250,940 Dated Oct. 17, 2014, 15 pages.

(Continued)

*Primary Examiner* — Frank Font
(74) *Attorney, Agent, or Firm* — Angel Gerdzhikov; Donna Suchy; Daniel Barbieri (57) ABSTRACT

A worn display, includes a projector and at least one wearable diffraction grating member. The member includes an input end for receiving an image from a projector and a combiner end for receiving light from a scene and providing the image received at the input end and the light received from the outside scene to the user. The worn display can be used in aircraft applications to provide guidance information to a pilot. The diffraction grating member can have periscopic characteristics.

20 Claims, 5 Drawing Sheets

(56) References Cited

U.S. PATENT DOCUMENTS

| | | |
|---|---|---|
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |
| 6,771,403 B1 | 8/2004 | Endo et al. |
| 6,776,339 B2 | 8/2004 | Piikivi |

(56) References Cited

U.S. PATENT DOCUMENTS

| | | |
|---|---|---|
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |

(56) References Cited

U.S. PATENT DOCUMENTS

| | | |
|---|---|---|
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,913,324 B2 | 12/2014 | Schrader |
| 8,938,141 B2 | 1/2015 | Magnusson |
| 2002/0021461 A1 | 2/2002 | Ono et al. |
| 2002/0131175 A1 | 9/2002 | Yagi et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1* | 6/2006 | Weiss et al. .................. 359/462 |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1* | 12/2008 | Vitale ................................ 345/8 |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2012/0007979 A1 | 1/2012 | Schneider et al. |

(56) References Cited

U.S. PATENT DOCUMENTS

| | | | |
|---|---|---|---|
| 2012/0033306 | A1 | 2/2012 | Valera et al. |
| 2012/0044572 | A1 | 2/2012 | Simmonds et al. |
| 2012/0044573 | A1 | 2/2012 | Simmonds et al. |
| 2012/0062850 | A1 | 3/2012 | Travis |
| 2012/0099203 | A1 | 4/2012 | Boubis et al. |
| 2012/0105634 | A1 | 5/2012 | Meidan et al. |
| 2012/0120493 | A1 | 5/2012 | Simmonds et al. |
| 2012/0127577 | A1 | 5/2012 | Desserouer |
| 2012/0235900 | A1 | 9/2012 | Border et al. |
| 2012/0242661 | A1 | 9/2012 | Takagi et al. |
| 2012/0280956 | A1 | 11/2012 | Yamamoto et al. |
| 2012/0300311 | A1 | 11/2012 | Simmonds et al. |
| 2013/0069850 | A1 | 3/2013 | Mukawa et al. |
| 2013/0101253 | A1 | 4/2013 | Popovich et al. |
| 2013/0138275 | A1 | 5/2013 | Nauman et al. |
| 2013/0141937 | A1 | 6/2013 | Katsuta et al. |
| 2013/0170031 | A1 | 7/2013 | Bohn et al. |
| 2013/0200710 | A1 | 8/2013 | Robbins |
| 2013/0249895 | A1 | 9/2013 | Westerinen et al. |
| 2013/0257848 | A1 | 10/2013 | Westerinen et al. |
| 2013/0258701 | A1 | 10/2013 | Westerinen et al. |
| 2013/0314793 | A1 | 11/2013 | Robbins et al. |
| 2013/0322810 | A1 | 12/2013 | Robbins |
| 2013/0328948 | A1 | 12/2013 | Kunkel et al. |
| 2014/0104665 | A1 | 4/2014 | Popovich et al. |
| 2014/0104685 | A1 | 4/2014 | Bohn et al. |
| 2014/0140653 | A1 | 5/2014 | Brown et al. |
| 2014/0140654 | A1 | 5/2014 | Brown et al. |
| 2014/0146394 | A1 | 5/2014 | Tout et al. |
| 2014/0152778 | A1 | 6/2014 | Ihlenburg et al. |
| 2014/0168055 | A1 | 6/2014 | Smith |
| 2014/0168260 | A1 | 6/2014 | O'Brien et al. |
| 2014/0168735 | A1 | 6/2014 | Yuan et al. |
| 2014/0172296 | A1 | 6/2014 | Shtukater |
| 2014/0176528 | A1 | 6/2014 | Robbins |
| 2014/0204455 | A1 | 7/2014 | Popovich et al. |
| 2014/0211322 | A1 | 7/2014 | Bohn et al. |
| 2014/0218801 | A1 | 8/2014 | Simmonds et al. |
| 2015/0010265 | A1 | 1/2015 | Popovich et al. |

FOREIGN PATENT DOCUMENTS

| | | | |
|---|---|---|---|
| EP | 2 110 701 | | 10/2009 |
| EP | 2 225 592 | | 9/2010 |
| EP | 2 381 290 | | 10/2011 |
| EP | 2 733 517 | | 5/2014 |
| FR | 2677463 | | 12/1992 |
| GB | 2115178 | A * | 9/1983 |
| JP | 2004-157245 | | 6/2004 |
| WO | WO-99/52002 | | 10/1999 |
| WO | WO-03/081320 | A1 | 10/2003 |
| WO | WO-2006/002870 | | 1/2006 |
| WO | WO-2007/130130 | A2 | 11/2007 |
| WO | WO-2007/130130 | A3 | 11/2007 |
| WO | WO-2009/013597 | A2 | 1/2009 |
| WO | WO-2009/077802 | | 6/2009 |
| WO | WO-2010/067114 | | 6/2010 |
| WO | WO-2010/067117 | | 6/2010 |
| WO | WO-2010/125337 | A2 | 11/2010 |
| WO | WO-2010/125337 | A3 | 11/2010 |
| WO | WO-2011/012825 | | 2/2011 |
| WO | WO-2011/051660 | A1 | 5/2011 |
| WO | WO-2011/055109 | A2 | 5/2011 |
| WO | WO-2011/107831 | | 9/2011 |
| WO | WO-2013/027006 | A1 | 2/2013 |
| WO | WO-2013/033274 | A1 | 3/2013 |
| WO | WO-2013/163347 | | 10/2013 |
| WO | WO-2014/091200 | | 6/2014 |

OTHER PUBLICATIONS

Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/864,991 Dated Oct. 22, 2014, 16 pages.
Office Action on U.S. Appl. No. 13/892,026 Dated Dec. 8, 2014, 19 pages.
Final Office Action on U.S. Appl. No. 13/250,858 Dated Feb. 4, 2015, 18 pages.
Non-Final Office Action on U.S. Appl. No. 14/038,400 Dated Feb. 5, 2015, 18 pages.
Final Office Action on U.S. Appl. No. 13/892,057 Dated Mar. 5, 2015, 21 pages.
Non-Final Office Action on U.S. Appl. No. 13/250,858 Dated Sep. 15, 2014, 16 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Ayras et al., Exit Pupil Expander with a Large Field of View Based on Diffractive Optics, Journal of the SID, 2009, 6 pages.
Restriction Requirement for U.S. Appl. No. 12/700,557, mail date Oct. 17, 2012, 5 pages.
Office Action for U.S. Appl. No. 12/700,557, mail date Feb. 4, 2013, 11 pages.
Office Action for U.S. Appl. No. 12/700,557, mail date Aug. 9, 2013, 12 pages.
Notice of Allowance for U.S. Appl. No. 12/700,557, mail date Oct. 22, 2013, 9 pages.
Cameron, A., The Application of Holographic Optical Waveguide Technology to Q-Sight Family of Helmet Mounted Displays, Proc. of SPIE, vol. 7326, 7326OH-1, 2009, 11 pages.
Office Action for U.S. Appl. No. 13/250,621, mail date May 21, 2013, 10 pages.
Office Action for U.S. Appl. No. 13/250,858 mail date Feb. 19, 2014, 13 pages.
Office Action for U.S. Appl. No. 13/250,858, mail date Oct. 28, 2013, 9 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Wisely, P.L., Head up and head mounted display performance improvements through advanced techniques in the manipulation of light, Proc. of SPIE vol. 7327, 732706-1, 2009, 10 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/892,026 Dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.

(56) References Cited

OTHER PUBLICATIONS

Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/250,858 dated Jun. 12, 2015, 20 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 ages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Non-Final Office Action on U.S. Appl. No. 14/152,756, mail date Aug. 25, 2015, 39 pages.
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/168,173 Dated Jun. 22, 2015, 14 pages.
Notice of Allowance on U.S. Appl. No. 13/355,360 Dated Apr. 10, 2014, 7 pages.
Office Action, U.S. Appl. No. 10/696,507, mailed on Nov. 13, 2008 (CTX-290US), 15 pages.

* cited by examiner

WORN DISPLAY SYSTEM AND METHOD WITHOUT REQUIRING REAL TIME TRACKING FOR BORESIGHT PRECISION

CROSS REFERENCE TO RELATED APPLICATIONS

The present application is a continuation of and claims priority to U.S. application Ser. No. 12/700,557, filed Feb. 4, 2010, by Brown, et al., assigned to assignee of the present application and incorporated herein by reference in its entirety.

BACKGROUND OF THE INVENTION

The present specification relates to displays. More particularly, the present specification relates to a worn display, such as a head worn display (HWD) also known as a head-mounted display.

Display systems have been used to provide information to users for various applications. In aircraft applications, displays can provide precision guidance information to a pilot. For example, head-up displays (HUDs) superimpose images from two sources, the outside world and a second source for presentation to the pilot. Head-up displays are especially useful in aircraft because they allow the pilot to view information related to flight parameters without diverting attention from the view of the outside world through the windshield. Conventional head-up displays require optical components that can be heavy, expensive, and take up space in the cockpit.

Worn displays such as head worn displays have similarly been used in aircraft applications to allow a pilot to view precision guidance information without diverting attention from the real world scene. One type of head worn display is a helmet mounted display in which optical components are mounted to the operator's helmet. Helmet mounted displays are primarily used in military applications.

Worn displays often must maintain boresight accuracy when displaying precision guidance information. To achieve boresight accuracy, the worn display requires a tracking sensor that determines the position of the worn components of the worn display with respect to the boresight so that the differences in positions can be accommodated. For example, head worn displays including helmet-mounted displays used in the cockpit of an aircraft often require head tracking to determine the orientation of head worn portion of the display so that the displayed material can be offset to produce conformal alignment with the real world scene.

Head tracking is typically performed by magnetic, inertial and/or optical sensors that determine the position of the component worn by the pilot in six degrees of movement. Head tracking equipment increases the size and cost of head worn displays. In addition, head tracking requires connectivity between the magnetic, inertial and/or optical sensors and the non-worn portion of the display system.

Thus, there is a need for a lower cost, lighter, and smaller worn display. Further, there is a need for a worn display which does not require a helmet. Further still, there is a need for a worn display that does not require connectivity (mechanical and/or electrical) between the component worn by the user and the rest of the display system. Yet further still, there is a need for a worn display where the component that is worn is entirely passive and insensitive to all six degrees of movement, (e.g., six degrees of freedom invariant). Further still, there is a need for a worn display optimized for use in the constrained cockpit area of small aircraft. Even further still, there is a need for a worn display that utilizes periscopic principles to achieve six-degree-of-freedom insensitivity. Yet further, there is a need for a head worn display that does not require headtracking and yet provides precision guidance information conformally aligned with the real world scene.

Accordingly, it would be desirable to provide a display system and/or method that provides one or more of these or other advantageous features. Other features or advantages will be made apparent in the present specification. The teachings disclosed extend to those embodiments which fall within the scope of the appended claims, regardless of whether they accomplish one or more of the aforementioned advantages or features.

SUMMARY OF THE INVENTION

An exemplary embodiment relates to a worn display for a user having eyes. The worn display includes a projector and at least one diffraction grating member configured to be wearable and physically separate from the projector and physically free from the projector across rotational movement of the at least one diffraction grating member. The diffraction grating member having an input end for receiving a collimated image from the projector and a combiner end for providing the collimated image received at the input end to the eyes of the user. The light received from the outside scene is viewable through the combiner end. The at least one diffraction grating member extends from the input end to the combiner end. The input end is configured to be disposed to receive the image from the projector in a position unobstructed by the user. The combiner end is configured to be disposed in front of the eyes.

Another exemplary embodiment relates to a worn device for use with a display projector providing a collimated or near collimated image to eyes of the user. The worn device includes a diffraction grating member configured so that a first end of the diffraction grating member can be provided in front of an eye of a user and a second end of the diffracting grating member receives the collimated or near collimated image. The first end receives light from a real world scene. The second end is disposed in a position unobstructed by the user. The diffraction grating member is physically separate from the display projector and physically free from the display projector across rotational movement of the diffraction grating member and worn by the user.

Another exemplary embodiment relates to a method of providing guidance information to a pilot of an aircraft. The method includes providing collimated or near collimated light indicative of the guidance information from a display to a passive element configured to be worn by the pilot. The passive element is electrically and physically free from the display. The passive element is a light weight waveguide including a pair of diffraction gratings. The waveguide is configured to have periscopic characteristics. The method also includes combining light from a real world scene with the collimated or near collimated light using the element.

An exemplary embodiment relates to a worn display, such as a head worn display. The worn display includes a projector and a periscopic system. The periscopic system is configured to be wearable. The periscope system includes at least one diffraction grating member. The diffraction grating member has an input end for receiving an image from the projector and a combiner end for receiving light from a scene. The diffraction grating member provides the image received at the input end and the light received from the outside scene to the user at the combiner end.

An exemplary embodiment relates to a head-mounted device for use with a display. The display provides a collimated or near collimated image. The head mounted device includes a first diffraction grating member and a second diffraction grating member. The first diffraction grating member and the second diffraction grating member are configured so that a first end of each of the diffraction grating members can be provided in front of a respective eye of a user and a second end of each of the first and second diffraction grating members receives the collimated or near collimated image. The first end receives light from a real world scene.

Yet another exemplary embodiment relates to a method of providing guidance information to a pilot of an aircraft. The method includes providing collimated or near collimated light indicative of the guidance information from a display to a passive element configured to be worn by the pilot. The passive element is electrically unconnected to the display. The method also includes combining light from a real world scene with the collimated or near collimated light using the element. The element includes a diffraction grating.

BRIEF DESCRIPTION OF THE DRAWINGS

Exemplary embodiments are hereinafter described with reference to the accompanying drawings, wherein like numerals refer to like elements, and.

DETAILED DESCRIPTION OF THE PREFERRED EMBODIMENTS

Before describing in detail the particular improved system and method, it should be observed that the invention includes, but is not limited to, a novel structural combination of optical components and not in the particular detailed configurations thereof. Accordingly, the structure, methods, functions, control, and arrangement of components have been illustrated in the drawings by readily understandable block representations and schematic drawings, in order not to obscure the disclosure with structural details which will be readily apparent to those skilled in the art, having the benefit of the description herein. The Figures are not drawn to scale. Further, the invention is not limited to the particular embodiments depicted in the exemplary diagrams, but should be construed in accordance with the language in the claims.

Figure 1:
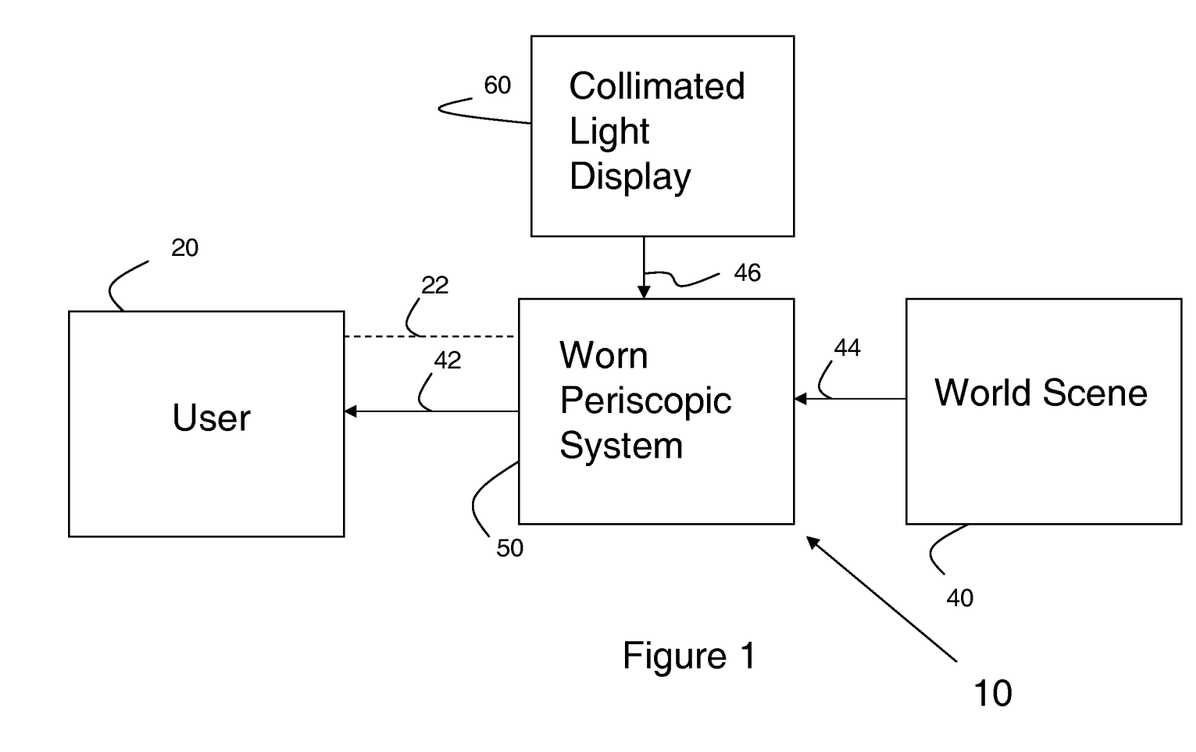
FIG. 1 is a general block diagram of a display system including at least one worn component in accordance with an exemplary embodiment.

With reference to FIG. 1, a wearable display system 10 is preferably configured as a head worn display (HWD). System 10 is described below for use in a cockpit of aircraft. However, system 10 can be utilized in a variety of applications, including driving applications, military applications, medical applications, targeting applications, etc. without departing from the scope of the invention.

System 10 preferably includes a periscopic system 50 and a collimated light display 60. Periscopic system 20 is preferably a wearable component of system 10 and can be attached to or worn by user 20 as represented by dashed line 22 in FIG. 1. Although preferably wearable on the head of user 20, system 50 can be coupled to user 20 in other fashions or onto other body parts.

Collimated light display 60 provides collimated light or a near collimated light 46 to periscopic system 50. Periscopic system 50 combines the near collimated or collimated light 46 with light 44 from a real world scene (preferably light is received through a windshield). The combined light is provided as light 42 to user 20.

Advantageously, according to one embodiment, system 10 does not require head tracking equipment and electrical connectivity is not required between periscopic system 50 worn by user 20 and collimated light display 60 or other parts of the aircraft. In a preferred embodiment, periscopic system 50 is preferably entirely passive and insensitive to movements in all six degrees of freedom. Advantageously, periscopic system 50 is configured so that rays of light 42 exiting periscopic system 60 to user 20 are parallel and in a reverse direction to rays of light 46 entering periscopic system 50 from display 60 according to a periscopic effect. Alternatively, system 50 can be arranged such that rays of light 42 exiting system 50 travel in a same direction and are parallel to rays of light 46.

Various optical components can be utilized to cause to the periscopic effect. For example, the periscope effect can be implemented by wave guides, mirrors, prisms, or other optical components. System 50 can also include additional optic components without departing from the invention.

Light 46 from collimated light display 60 preferably provides information to user 20. The information can be any type of information useful to user 20. In an aircraft application and according to one exemplary embodiment, the information can be flight parameters, such as, precision guidance information, navigation information, aircraft instrumentation information, or other flight information or warnings used when flying an aircraft. Alternatively, other types of information can be provided by collimated light display 60 depending upon system criteria and application parameters. For example, display 60 can be used to provide targeting information in military applications or guidance information in surgical applications. Advantageously, the combination of collimated light display 60 and periscopic system 50 provides a virtual image at optical infinity or near optical infinity of the information associated with light 46 for user 20 similar to an image produced by a conventional head-up display (HUD).

According to a preferred embodiment, periscopic system 50 is a waveguide that operates both as a guide for collimated light 46 from display 60 and a combiner for combining light 46 with light 44 for viewing by user 20. In one embodiment, periscopic system 50 utilizes a waveguide with diffraction gratings to achieve the periscopic effect. The waveguide is preferably lighter than more conventional optics such as mirrors, prisms, lenses, etc. Alternatively, other optical light weight components suitable for wearing by user 20 can be used (e.g., lenses, filters, coatings, etc.).

Unlike conventional HUDs, light 46 from display 60 is preferably transmitted through a waveguide rather than entirely through free space. The use of a waveguide and diffraction gratings allows periscopic system 50 to operate as an extremely compact and lightweight periscope. Such compactness is advantageous in aircraft, especially aircraft with smaller cockpits.

System 10 preferably has a 10-25 millimeter exit pupil. The use of the diffraction gratings advantageously enables pupil expansion in which a small collimated beam (e.g., light 46) is expanded in diameter to allow more range of eye motion while seeing the entire image from display system 60. Advantageously, the nature of periscopic system 50 allows it to be handheld and allows the display of the information to be extremely stable while the diffraction grating is rotated over large ranges. The boresight angle remains parallel as collimated light source 60 is fixed with respect to the boresight angle.

Figure 2:
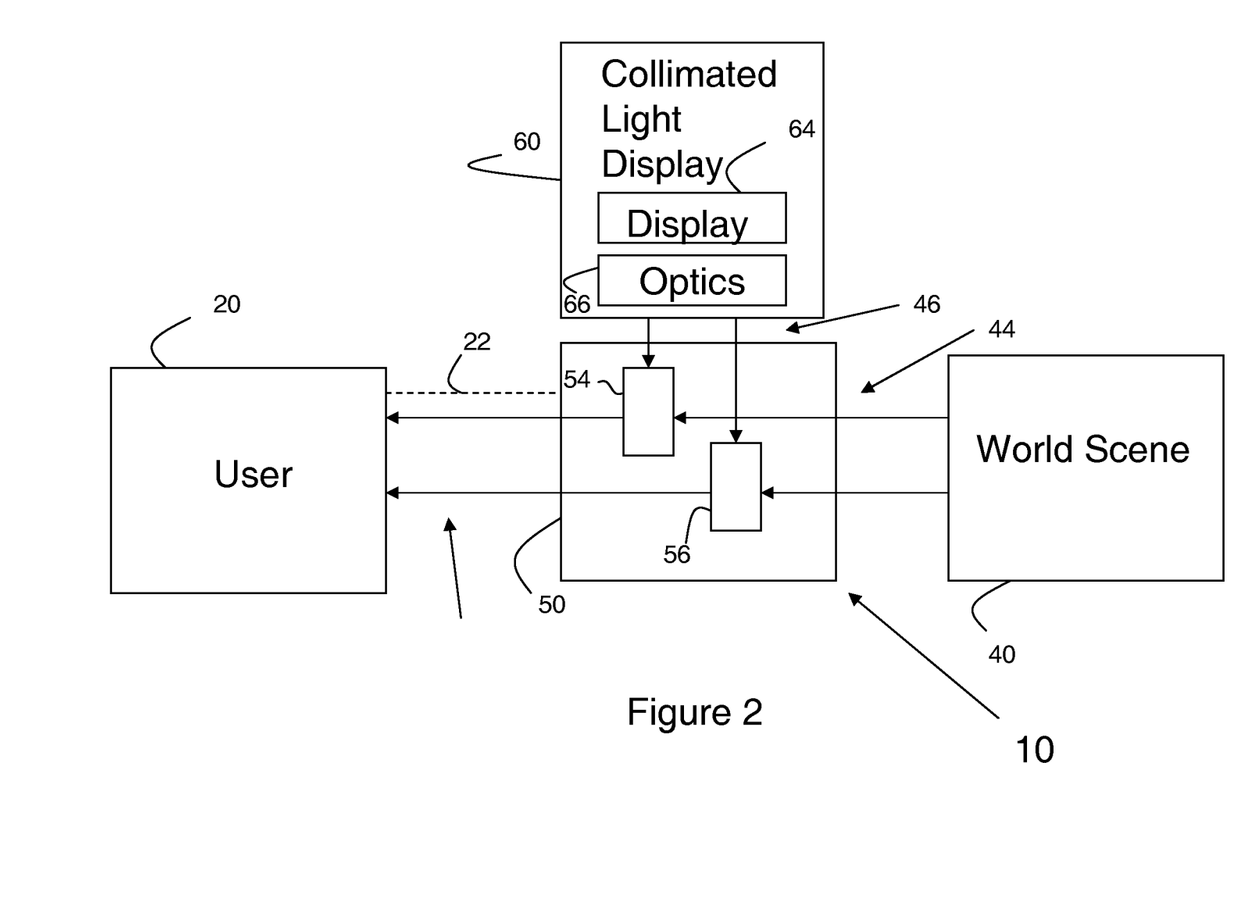
FIG. 2 is a more detailed block diagram of a display system similar to the system illustrated in FIG. 1 and including two waveguides in accordance with another exemplary embodiment.

With reference to FIG. 2, collimated light display 60 preferably includes a display 64 and optics 66. Optics 66 can include projection optics, mirrors, prisms, collimating optics, lenses (e.g., a field flattener lens), etc. Alternatively, display 64 can provide collimated light without requiring additional optics such as optics 66. Display 60 is preferably aligned with the boresight of the aircraft during installation. Preferably, collimated light display 60 is provided as an overhead mounted collimator. Alternatively, display system 60 can be a binocular collimator (e.g., one for each eye).

Display 64 can be a display of any type including a microdisplay, an active matrix LCD display, a CRT, an OLED display, a fixed display, or any type of device for providing collimated light to periscopic system 50. System 60 can be a projector used in conventional HUD.

Advantageously, periscopic system 50 can eliminate the requirement for expensive combiner stow and breakaway mechanisms. Further, system 50 can eliminate the need for combiner alignment detection and associated integrity monitoring. In one embodiment, system 50 is used with electronics and projectors associated with conventional head worn displays (e.g., HMDs), and/or conventional HUDs.

Contrary to the operation of conventional HMDs, system 10 has a fixed field of view. If user 20 rotates his or her head farther than the field of view collimated light display 60, the display image is entirely lost. Preferably, user 20 is located at the design eye associated with system 10. The eyebox of system 10 can have reasonably similar tolerances to conventional HUD technologies.

Periscopic system 50 preferably includes at least one diffraction grating member. In a preferred embodiment, system 50 includes a pair of waveguides 54 and 56, each including a set of diffraction gratings for diffracting light in accordance with a periscopic effect. Preferably, waveguides 54 and 56 operate as a pair of waveguides, one for each eye that couples light 46 from display 60 into the eyes of user 20 and also provides adequate field of view and adequate eyebox for viewing comfort. The light weight associated with waveguides 54 and 56 allow them to be easily worn by user 20. For example, wearing waveguides 54 and 56 can be as comfortable as wearing sunglasses.

Figure 7:
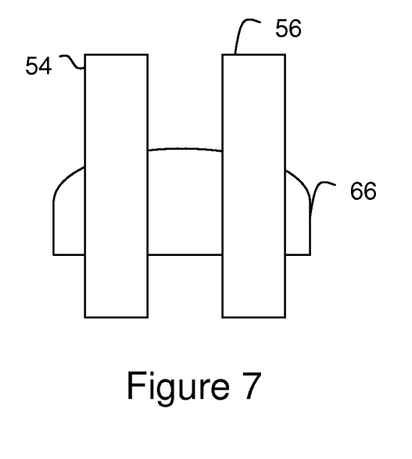
FIG. 7 is a front planar view schematic drawing of the periscopic system illustrated in FIG. 2 attached to a hat in accordance with still another exemplary embodiment.
Figure 8:
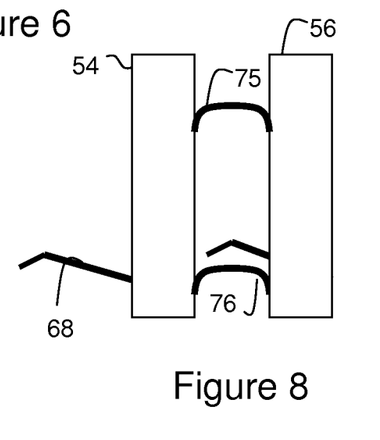
FIG. 8 is a front planar view schematic drawing of the periscopic system illustrated in FIG. 2 configured to be worn by a user as glasses in accordance with another exemplary embodiment.

With reference to FIG. 7, the waveguides 54 and 56 can be attached to a cap, helmet or hat 66. With reference to FIG. 8, waveguides 54 and 56 can be worn as glasses. Temple arms 60 can be utilized to situate waveguides in front of a user's eyes. Frame members 75 and 76 can provide stability. Member 76 can rest on a user's nose.

The alignment of waveguides 54 and 56 to each other is not critical because waveguides 54 and 56 are preferably optically rotationally invariant. In a preferred embodiment, optical invariance to rotation can be achieved using the periscopic principles associated with periscopic system 50. System 50 is preferably configured so that rays entering system 50 exit system 50 along new paths exactly parallel to original paths, regardless of orientation of system 50. System 50 is configured for this characteristic for all six degrees of freedom of orientation of system 50 in accordance with operational principles of a periscopic device. In addition, alignment with hat 66 or frame members 76 is not critical. Waveguides 54 and 56 can be provided as a unitary piece or be mechanically connected to each other in a variety of fashions. Preferably, waveguides 54 and 56 are oriented at 20 to 40 degrees to the pilot's line of sight along the boresight.

Although shown as two distinct waveguides 54 and 56, waveguides 54 and 56 can be combined as a single waveguide. Preferably, waveguides 54 and 56 are manufactured with relatively low cost material, such as, plastic, glass, etc. Waveguides 54 and 56 preferably do not include expensive coatings and could even be considered disposable items or items to be issued to aircraft pilots rather than as aircraft equipment.

In an alternative embodiment, system 10 can be a helmet mounted display such as for military helmets where head tracking is already accepted. In such an embodiment, there are no alignment restrictions other than boresighting of the head tracker because the alignment of waveguides 54 and 56 is insensitive. In this embodiment, the need for precision interfaces for helmet visors can be eliminated, thereby substantially reducing costs of the helmet assembly.

Figure 3:
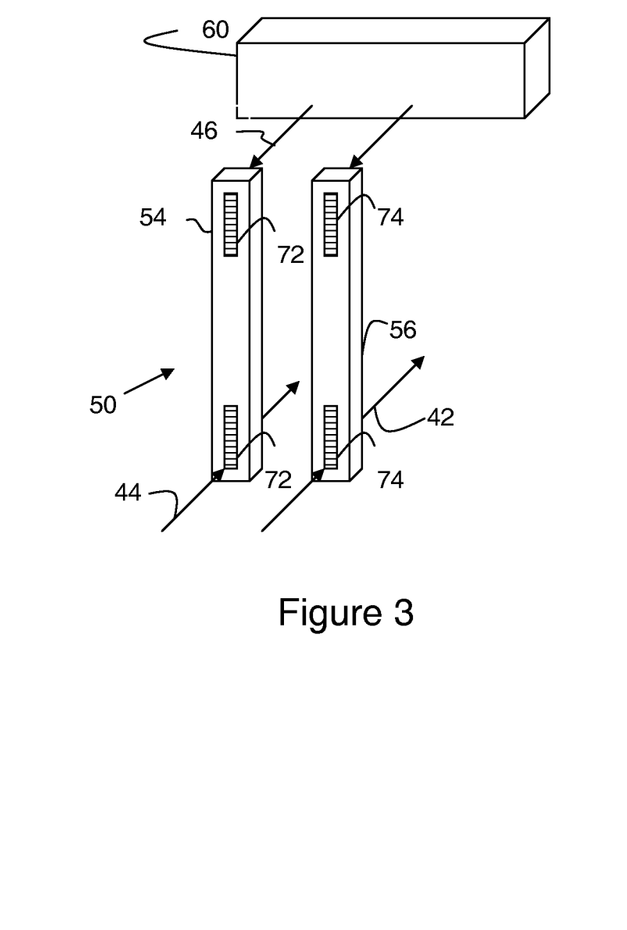
FIG. 3 is a perspective view schematic drawing of the system illustrated in FIG. 2 in accordance with a further exemplary embodiment.
Figure 4:
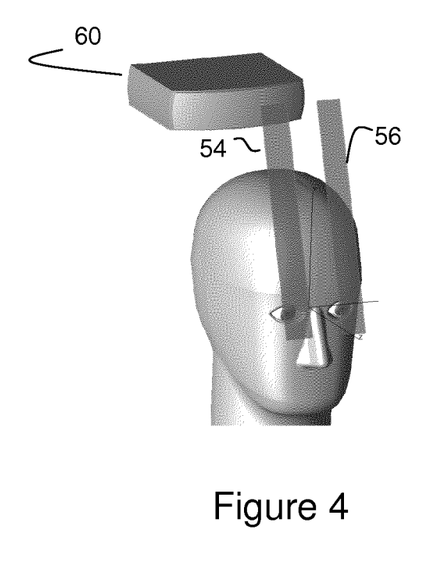
FIG. 4 is another perspective view schematic drawing showing the system illustrated in FIG. 2 with a user in accordance with yet another exemplary embodiment.
Figure 5:
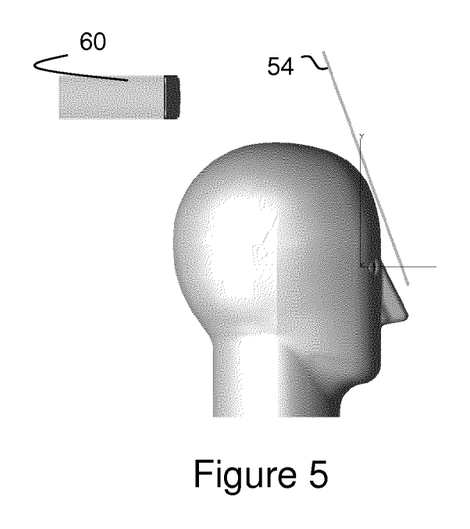
FIG. 5 is a side planar view schematic drawing of the system illustrated in FIG. 4.
Figure 6:
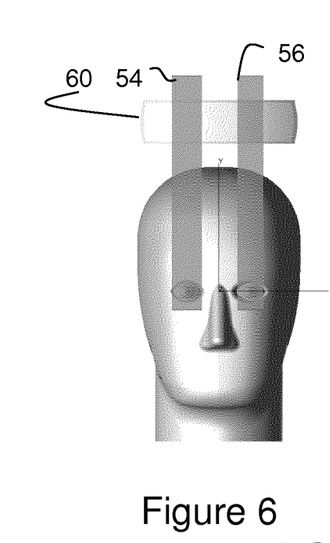
FIG. 6 is a front planar view schematic drawing of the system illustrated in FIG. 4.

With reference to FIG. 3 and according to a preferred embodiment, waveguides 54 and 56 include sets of diffraction gratings 72 and 74, respectively. Preferably, gratings 72 and 74 have a spatial frequency of 2000 to 4000 lines per millimeter. Diffraction gratings 72 and 74 can be many manufactured according to a variety of techniques. As shown in FIGS. 3-6, projector 60 can be provided above and behind the head of the user in certain embodiments.

Gratings 72 and 74 can be formed by etching, cutting, printing, wet chemical, dry chemical, ion etching, laser etching, electron bean etching, staining, holographic exposure, etc. Waveguides 54 and 56 are preferably manufactured from any suitable material including, but not limited to transparent or translucent materials, such as, dielectric materials with high permittivity and high index of refraction (e.g., glass or plastic). Waveguides 54 and 56 can also be a laminate material and can be shaded or coated for filtering light.

Waveguides 54 and 56 preferably have a rectangular prismatic shape having a length larger than its width and a thickness smaller than its width. The dimensions of waveguides can be 10×2×0.125 inches. In a preferred embodiment, waveguides 54 and 56 are flat and flexible.

Diffraction gratings 72 and 74 can be providing only on a first-end (input end) and a second end (output or combiner end) of waveguides 54 and 56 for effecting the periscopic effect. The intermediate portion between the first end and second end is preferably free of diffraction gratings and operates as a waveguide between the input and output.

System criteria and application parameters may affect the size and type of spacing for gratings 72 and 74. Preferably, the area associated with the input of light 46 is larger than the area associated with the output of light 42. The difference in area results in an effective compression rather than expansion of beams incident on waveguide 54. The areas can be at any ratios depending upon design criteria and system applications. For example, the use of a smaller display and design criteria of a larger pupil would result in a larger area ratio. In one embodiment, such a compression can be limited by the need to have an exit pupil large enough to allow a degree of freedom of movement of the pilot's head without loss of display.

Figure 9:
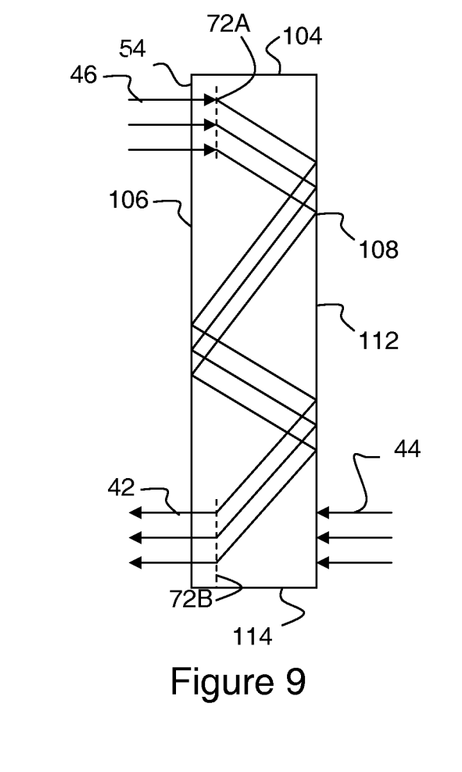
FIG. 9 is a more detailed block diagram of one of the waveguides illustrated in FIG. 2, in accordance with another exemplary embodiment.

With reference to FIG. 9, waveguide 54 is similar to waveguide 56 and includes a diffraction grating 72*a* and diffraction grating 72*b*. Light 46 from display system 60 enters waveguide 54 at a first side 106 at end 114 with combined light 42 on a first end 104 and is diffracted by grating 72 downward towards a second end 114 and towards a side 108.

Light 46 is reflected by total internal reflection from side 108 to side 106 and from side 106 to side 108 as it travels across intermediate portion 112. Light 46 travels through waveguide 54 until it eventually strikes diffraction grating 72*b* where it is diffracted toward side 106 and exits substrate 54 on side 106. Combined light 42 includes light 46 and light 44 from side 108.

Grating 72*a* is preferably more efficient than grating 72*b*. In one embodiment, gratings 72B is approximately 10 percent efficient so that a large portion of light 46 can travel through grating 72*b* to side 106. The portion of light 46 diffracted by grating 72*b* travels through the waveguide and is eventually lost to absorption. Grating 72*a* preferably has an efficiency of more than 90 percent (most preferably as efficient as possible so light 46 from display system 60 does not unnecessarily escape waveguide 54).

The specific configuration of FIG. 9 is shown by way of example only. The angle of incidence, number of reflections, etc., are shown for purposes of discussion only. For example, a multitude of reflections occur as light travels across portion 112 from end 104 toward end 114, according to one embodiment. The present invention is not limited to the detail shown in Figure Various geometries and placement of the display system 60 are possible and can be configured for specific cockpit geometries. System 60 can utilize a reflective device utilized by conventional substrate guided HUD systems. Expense can be saved using molded optics and more simplistic coatings in system 10.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of materials, dimensions, and processes are mentioned, other materials, dimensions, and process steps can be utilized. Various changes may be made to the details disclosed without departing from the spirit of the invention which is defined by the following claims.

What is claimed is:

1. A worn display for a user having eyes, the worn display comprising:
   a projector; and
   at least one diffraction grating member configured to be wearable and physically separate from the projector and physically free from the projector across rotational movement of the at least one diffraction grating member, the diffraction grating member having an input end for receiving a collimated image from the projector, and a combiner end for providing the collimated image received at the input end to the eyes of the user and wherein the light received from an outside scene is viewable through the combiner end, the at least one diffraction grating member extending from the input end to the combiner end, wherein the input end is configured to be disposed to receive the collimated image from the projector in a position unobstructed by the user and the combiner end is configured to be disposed in front of the eyes.

2. The display of claim 1, wherein the diffraction grating member is a periscopic system comprising two separate diffraction grating members, each diffraction grating member being disposed in front of a respective one of the eyes at the combiner end; wherein the diffraction grating members are elongated rectangles extending longitudinally from the input end to the combiner end.

3. The display of claim 2, wherein each diffraction grating member comprises at least one diffraction grating having a spatial frequency of 2000-4000 gratings per millimeter.

4. The display of claim 3, wherein the diffraction grating is etched or printed.

5. The display of claim 4, wherein the diffraction grating members are each a unitary piece of plastic material.

6. The display of claim 5, wherein the diffraction grating members are bendable.

7. The display of claim 6, wherein the diffraction grating members have a thin rectangular prismatic shape.

8. The display of claim 7, wherein the projector is a micro display.

9. The display of claim 2, wherein an intermediate section of the diffraction grating members is disposed between the combiner end and the input end and does not include a grating.

10. A worn device for use with a display projector providing a collimated or near collimated image to at least one eye of a user, the worn device comprises:
    a diffraction grating member configured so that a first end of the diffraction grating member can be provided in front of an eye of a user and a second end of the diffraction grating member receives the collimated or near collimated image, wherein the first end receives light from a real world scene, wherein the second end is disposed in a position unobstructed by the user, wherein the diffraction grating member is physically separate from the display projector and physically free from the display projector across rotational movement of the diffraction grating member when worn by the user.

11. The worn device of claim 10, wherein the diffraction grating member provides a periscopic effect.

12. The worn device of claim 11, wherein the diffraction grating member includes markings at a spatial frequency between 2000 and 4000 gratings per millimeter.

13. The worn device of claim 12, wherein the member is a unitary piece comprised of flexible plastic material.

14. The worn device of claim 10, wherein the diffraction grating member has a first flat planar side and a second flat planar side, where the first side is opposite the second side and is closer to the respective eye than the second side and the collimated or near collimated image is received from the display projector on the first side, and the light from the real world scene is received on the second side.

15. The worn device of claim 10, wherein the diffraction grating member is flat and flexible.

16. The worn device of claim 15, wherein the display for providing the collimator or near collimated image is provided behind a user.

17. A method of providing guidance information to at least one eye of a user using a display projector comprising a display and a worn device, the method comprising:
    providing a collimated or near collimated image indicative of the guidance information from the display using a diffraction grating member of the worn device configured so that a first end of the diffraction grating member of the worn device can be provided in front of the eye of the user and a second end of the diffraction grating member receives the collimated or near collimated image, wherein the first end receives light from a real world scene, wherein the second end is disposed in a position unobstructed by the user, wherein the diffraction grating member is physically separate from the display projector and physically free from the display projector across rotational movement of the diffraction grating member when worn by the user; and combining light received from a real world scene at the first end with the collimated or near collimated light using the diffraction grating member.

18. The method of claim 17, wherein the diffraction grating member comprises a pair of passive elements.

19. The method of claim 17, wherein the diffraction grating member comprises a thin plastic waveguide substrate.

20. The method of claim 17, wherein the diffraction grating member is attached to a hat or to temple frames.

* * * * *

UNITED STATES PATENT AND TRADEMARK OFFICE
CERTIFICATE OF CORRECTION

| | | |
|---|---|---|
| PATENT NO. | : 9,274,339 B1 | Page 1 of 1 |
| APPLICATION NO. | : 14/109551 | |
| DATED | : March 1, 2016 | |
| INVENTOR(S) | : Robert D. Brown, Steven J. Robbins and Francois Raynal | |

It is certified that error appears in the above-identified patent and that said Letters Patent is hereby corrected as shown below:

Claims

Column 8, Claim 16:

Line 59, please insert --projector-- after "wherein the display"

Column 9, Claim 17:

Line 12, please delete "a" after "light received from"
Line 12, please insert --the-- after "light received from"

Signed and Sealed this
Fifth Day of July, 2016

Michelle K. Lee
*Director of the United States Patent and Trademark Office*